United States Patent
Ohya et al.

(10) Patent No.: US 6,634,246 B2
(45) Date of Patent: Oct. 21, 2003

(54) RECIRCULATING-BALL NUT AND SCREW SET WITH LUBRICATING MEANS

(75) Inventors: Yasumasa Ohya, Gifu-ken (JP); Toyohisa Ishihara, Gifu-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 30 days.

(21) Appl. No.: 09/987,394

(22) Filed: Nov. 14, 2001

(65) Prior Publication Data

US 2002/0056333 A1 May 16, 2002

(30) Foreign Application Priority Data

Nov. 14, 2000 (JP) ........................................ 2000-347002

(51) Int. Cl.[7] .............................................. F16H 57/04
(52) U.S. Cl. ........................................ 74/89.44; 74/467
(58) Field of Search ................................. 74/89.44, 467

(56) References Cited

U.S. PATENT DOCUMENTS

| | | | | |
|---|---|---|---|---|
| 4,175,475 A | * | 11/1979 | Eckhardt | 74/89.4 |
| 4,226,431 A | * | 10/1980 | Jelinek et al. | 74/89.4 |
| 5,029,877 A | * | 7/1991 | Fedeli | 74/89.4 |
| 5,906,136 A | * | 5/1999 | Yabe et al. | 74/424.72 |
| 6,155,717 A | * | 12/2000 | Michioka et al. | 74/424.82 |
| 6,237,434 B1 | * | 5/2001 | Brown et al. | 74/441 |
| 2001/0037695 A1 | * | 11/2001 | Tsukada et al. | 74/89.44 |

FOREIGN PATENT DOCUMENTS

| | | |
|---|---|---|
| JP | 273552/1997 | 10/1997 |
| JP | 184863/1998 | 7/1998 |
| JP | 27861/2000 | 1/2000 |
| JP | 35038/2000 | 2/2000 |
| JP | 81103/2000 | 3/2000 |

* cited by examiner

*Primary Examiner*—Thomas R. Hannon
*Assistant Examiner*—Bradley J. Van Pelt
(74) *Attorney, Agent, or Firm*—Browdy and Neimark, P.L.L.C.

(57) ABSTRACT

A recirculating-ball nut and screw set mounted with a lubrication device effective in improving the sliding characteristic and also realizing maintenance-free lubrication. The lubrication device is mainly comprised of a lubricating plate accommodated in a holder attached to a ball nut. The lubricating plate is made with a tongue that will come into sliding engagement with a helical groove formed around a screw shaft. The lubricating plate is made of a sintered resinous component of porous structure in which cells are impregnated with lubricant.

8 Claims, 9 Drawing Sheets

RECIRCULATING-BALL NUT AND SCREW SET WITH LUBRICATING MEANS

BACKGROUND OF THE INVENTION

1. Field of the Invention

The present invention relates to a recirculating-ball nut and screw set with lubricating means, which is suitable for use in industrial robots, semiconductor fabricating equipments, precision instruments, machine tools, and so on.

2. Description of the Prior Art

The linear motion guide units have been conventionally incorporated in the parts or components movable back and forth, which are used extensively in engineering fields as diverse as industrial robots, semiconductor fabricating equipments, inspection instruments, machine tools, and so on. The recently remarkable development in mechatronics technology extensively requires linear motion guide units because of high precision, high speed, compactness and so on. Moreover, the linear motion guide units recently have become required to meet with a need of maintenance-free, along with high precision and high speed in operation. To cope with the maintenance-free demands, the linear motion guide unit has required the self-lubrication of long-lasting service life on its relative sliding areas.

A recirculating-ball nut and screw set for the linear motion guide units shown in FIGS. 14 and 15 is conventionally well known and, for example, as disclosed in Japanese Patent Laid-Open No. 273552/1997. The prior recirculating-ball nut and screw set in FIGS. 14 and 15 is mainly comprised of a screw shaft 1 made around an outer periphery 13 thereof with a helical external groove 3 extending lengthwise of the screw shaft 1, a ball nut 2 fit loosely over the screw shaft 1 and provided on an inner surface 12 thereof with a helical internal groove 14 confronting the helical groove 3 of the screw shaft 1, balls 7 charged to roll in a raceway 15 defined between the confronting helical grooves 3 and 14, and a return guide 4 allowing the balls 7 to recirculate from one end to the other end of the ball nut 2. The ball nut 2 is composed of a flange 6 made with bolt holes 11 to fasten any object such as appliances, bases, parts, components, and so on thereto, and a hollow cylinder 17 having the helical internal groove 14 on the inner surface 12 thereof. The return guide 4 is communicated at its opposite ends to the raceway 15 through connecting port formed in the ball nut 2 and also secured to a flat area 20 on the hollow cylinder 17 of the ball nut 2 by means of a fastener 8, which is held with machine screws 19.

The ball nut 2 has a lubricant supply port 9 threaded at 18, where a lubricant line, not shown, is connected to feed lubricant to the helical grooves 3 and 14 and balls 7. Moreover, the recirculating-ball nut and screw set is provided with either wiper seals 5 or labyrinths. On forward and aft ends of the nut 2 there are annular recesses 16 in which the wiper seals 5 fit, each to each recess, to keep foreign matter such as dust and dirt from invasion inside the nut 2, especially inside the raceway 15.

There are also well known linear motion guide units with onboard lubricant plates, for example as disclosed in Japanese Patent Laid-Open No. 27861/2000, in which a slider with onboard lubricant plates fits over a round track shaft for sliding movement and any lubricant plate may be applicable without any modification on basic design specifications and also installed detachably in the slider. The lubricant plate is usually made of a sintered resinous component of cellular structure, which is impregnated with any lubricant and secured onto a core metal. The sintered resinous component is fabricated by heating finely powdered synthetic resin under pressure in a design mold. Each lubricant plate is held on a carriage of the slider, with interposed between the core metal and an end cap, which are arranged on any one of the forward and aft ends of the slider. Thus, the lubricant plates are allowed to travel relatively to the round track shaft, with keeping sliding engagement with at least raceway grooves on the track shaft.

Another type of the linear motion guide unit is disclosed in Japanese Patent Laid-Open No. 35038/2000, in which the slider with onboard lubricating plate assemblies fits over the round track shaft for sliding movement and installed in a large bore formed in appliance housing. The slider is also kept against escape out of the track shaft by means of retaining rings. The lubricating plate assemblies are each enclosed in a case and composed of a lubricant plate of sintered resinous component having cellular structure impregnated with lubricant, and an end seal. The lubricant will ooze little by little from the lubricant plate to lubricate the round track shaft as the slider moves along the round track shaft.

A recirculating-ball nut and screw set with onboard lubricating means is also known, for example disclosed in Japanese Patent Laid-Open No. 81103/2000, in which lubricant-containing polymer members are mounted on a ball nut, with coming into sliding contact with only the outermost diametral periphery of the round track shaft. When the slider moves along the round track shaft, the lubricant-containing polymer members slide on the round track shaft without scraping away the lubricant deposited in the grooves. Thus, the lubricant always remains accumulated in the grooves where the balls run through there.

In Japanese Patent Laid-Open No. 184683/1998 there is disclosed a linear motion guide unit having incorporated with a lubricant supply means, which includes a lubricant applicator coming into a sliding engagement with a round track shaft to apply the lubricant thereto, a lubricant occlusive body arranged near the lubricant applicator in a casing to store the lubricant while feed the lubricant to the lubricant applicator, and lubricant-metering means to control an amount of lubricant to be transferred to the lubricant applicator from the lubricant occlusive body.

Meanwhile, as the linear motion guide units such as linear rolling motion guide units, recirculating-ball nut and screw set and the like are recently finding a growing variety of applications in diverse fields, they become increasingly used under unfavorable operating conditions or adverse environments, for example, where no replenishment of lubricating oil is allowed, much dirt and debris contamination may occur and there is abnormally high in temperature or moisture. In recent years the linear motion guide units are needed to work in any clean room where the occurrence of dirt and debris has to be staved off to keep the desired cleanliness. Because of the current tendency as stated earlier, much attention has been given the development of the linear motion guide units having no fear of lubrication failures even under the severe operating conditions where it is very hard to achieve the normal lubrication. For the recirculating-ball nut and screw set, especially any maintenance-free lubrication system is needed and so many kinds of the lubrication systems have been heretofore devised to be installed in the recirculating-ball nut and screw set.

Nevertheless, many prior lubrication systems are installed on any one of forward and aft ends of the recirculating-ball nut and screw set, and complicated in construction, very tough to produce them, needed to modify the specification in compliance to the design of the ball nut and screw set to which the lubrication system is applied, and also troublesome to use. Recent advances in the various equipments such as semiconductor fabricating equipments and the like result in the diversity and higher speed of the linear motion guide units. Even if any periodic lubrication were ensured, there would be no possibility of lubrication failure led to any breakage or premature age. However, the piping work for lubrication system is tedious and the current operating situations make it even tougher to ensure that lubricant is supplied evenly into all the sliding surfaces. Thus, it remains a major challenge to develop a recirculating-ball and screw set that is maintenance-free in lubrication and also less in the occurrence of dirt and debris.

With the lubrication system incorporated in the recirculating-ball nut and screw set constructed as stated earlier, for instance a lubricant-containing polymer member is employed, in which a polymer member is mixed with lubricant and fused by heating, followed by solidification in a desired mold under high pressure in cold temperature. The lubricant-containing polymer member stated earlier, because of sophisticated in production technology, need the high technology and expensive cost for the production thereof.

SUMMARY OF THE INVENTION

The present invention has for its primary object to resolve the subject matter as stated above, and to provide lubrication means of maintenance-free, which is suitable for a recirculating-ball nut and screw set commonly used to drive a slider in linear motion guide units. More particularly, the present invention provides a recirculating-ball nut and screw set with lubrication means that has a lubricating plate assembly of self-lubrication, which makes it possible to continue keeping the desirable lubrication even under any severe working conditions, thereby making sure of an acceptable long service life and improvement in dustproofing, moreover refraining from the occurrence of dirt and debris to keep a clean environment, and realizing sufficient maintenance-free as for lubricant replenishment, with even easy to produce it. According the lubrication means of the present invention, any presently available linear motion guide unit having a round track shaft may have simply mounted with the lubricating plate assembly with only some modifications on design consideration.

The present invention is concerned with a recirculating-ball nut and screw set with lubrication means, comprising a round screw shaft extending lengthwise, a ball nut fitting around the screw shaft to provide a slider movable along the screw shaft by virtue of balls as the screw shaft turns on its own axis, and lubrication means installed on at least one end of forward and aft ends of the ball nut, wherein the lubrication means is comprised of a holder fastened to the ball nut, and at least one lubricating plate accommodated in the holder in a manner coming into sliding engagement with a helical groove formed around the round screw shaft, the lubricating plate being made of a sintered resinous component of porous structure having cells impregnated with lubricant.

According to one aspect of the present invention, there is disclosed a recirculating-ball nut and screw set in which the lubricating plate has a tongue that extends inwardly from an inside periphery of the lubricating plate to come partially into sliding engagement with the helical groove, so that the lubricating plate makes sliding engagement with the helical groove at only the tongue when the ball nut moves back and forward with respect to the crew shaft.

According to another aspect of the present invention, there is disclosed a recirculating-ball nut and screw set in which the tongue of the lubricating plate is made less in width than the helical groove to thereby making sure of snug fit in the helical groove, while the width of the tongue in the lubricating plate is substantially equal in size with a thickness of the lubricating plate.

According to another aspect of the present invention, there is disclosed a recirculating-ball nut and screw set in which the lubricating plate includes a first annular lubricating plate made with the tongue, and at least one second annular lubricating plate arranged in surface contact with the first lubricating plate so as to replenish the first lubricating plate with the lubricant. Moreover, the second lubricating plate is identical in configuration to the first lubricating plate without the tongue, and more than one second lubricating plate is accommodated in the holder in a manner lying top on another.

According to another aspect of the present invention, there is disclosed a recirculating-ball nut and screw set in which the first lubricating plate is matched in number to that of the helical groove formed around the screw shaft, and the tongues of the first lubricating plates come into sliding engagement with the helical grooves, each to each groove, to apply the lubricant to the helical grooves, respectively. Moreover, the first and second lubricating plates are both cut away from a sintered resinous stock in a configuration of C-shape where a sector is removed circumferentially.

According to a further another aspect of the present invention, there is disclosed a recirculating-ball nut and screw set in which the holder is made in a hollow cylinder having an outside diameter made somewhat smaller than that of the ball nut.

According to another aspect of the present invention, there is disclosed a recirculating-ball nut and screw set in which the holder is fit at any one end of forward and aft ends thereof in the ball nut, while at another end around a wiper seal.

According to another aspect of the present invention, there is disclosed a recirculating-ball nut and screw set in which the holder is composed of a radially reduced neck having the one end that fits in the ball nut and also has an inside diameter to allow the screw shaft to fit loosely in the radially reduced neck, and a radially enlarged body formed integrally with the radially reduced neck and made larger in outer diameter than that of the radially reduced neck to provide a shoulder, which comes into abutment against an associated end surface of the ball nut. In addition, the radially enlarged body includes a major area for accommodating therein the lubricating plate, which is made larger in inside diameter than that of the radially reduced neck, and the another end for fitting around the wiper seal, which has an inside diameter smaller than that of the major area but larger than that of the radially reduced neck.

According to another aspect of the present invention, there is disclosed a recirculating-ball nut and screw set in which a radial offset owing to a difference between the inside diameter of the another end conforming to the wiper seal and the inside diameter of the major area to contain the lubricating plate therein is instrumental in keeping the lubricating plate against escape out of the major area.

According to another aspect of the present invention, there is disclosed a recirculating-ball nut and screw set in which the lubricating plate is made in a configuration where a sector is cut away circumferentially to form a sectorial gap, and the lubricating plate is compressed to reduce circumferentially the sectorial gap to install the lubricating plate across the another end of the radially enlarged body into the major area inside the holder.

The lubrication means for the recirculating-ball nut and screw set of the present invention, as being constructed as stated earlier, is easy in production, simple in construction, ready for handling such as mounting, replacement and so on, compared with the prior lubrication system. Further, the lubrication means of the present invention is commonly applicable to the currently available recirculating-ball nut and screw set without any substantial modification to the basic design considerations of the prior ball nut and screw set. Since only the tongue formed on the lubricating plate comes into the helical groove around the screw shaft, the lubrication means of the present invention succeeds in much reducing any frictional resistance that is encountered when the ball nut moves back and forward in a sliding manner with respect to the screw shaft. Thus, the lubricating plate incorporated in the lubrication means of the present invention makes sure of a continual application of a proper amount of lubricant to the screw shaft without negatively affecting the relative sliding motion between the ball nut and the screw shaft, thereby improving the sliding characteristics. Moreover, as more than one lubricating plate is accommodated in the holder with being superposed upon each other, lubricant is allowed to flow continually to the tongue, thus making sure of the long-lasting, steady lubrication of the helical groove. As the lubricating plates are installed in a cavity having a large inside diameter in the radially enlarged body of the holder, they are kept against escape out of the holder even when the lubricating plate experiences any stroke of the ball nut.

With the recirculating-ball nut and screw set constructed as stated above, the lubricating plate comes into sliding engagement at only a part thereof with the helical groove. This construction has advantage of reducing any frictional resistance that is encountered when the ball nut moves relatively to the screw shaft, thereby making wear less and also reducing the occurrence of dirt, metal cuttings and so on, with even keeping a smooth, continual supply of lubricant from the tongue to the helical groove to eliminate an occurrence of lubrication failure, thus making sure of good lubrication. In addition, the lubricating plate is impregnated with any lubricant selected from lubricating oils of various kinds so as to conform in functional demands to the porous, sintered resinous component. As an alternative, resinous substance of the sintered component for the lubricating plate may be selected to be suited for the lubricant employed. Moreover, the sintered resinous component for the lubricating plate, as superior in workability and ready for modification in design specifications, may be prepared with high accuracy as any part or component most suitable for the recirculating-ball and screw set incorporated in the semiconductor fabricating equipment and precision instruments.

The lubrication means constructed as stated earlier can easily fit, instead of the wiper seal, in most presently available recirculating-ball nut and screw sets with no need of changing their basic specifications. Namely, the lubrication means according to the present invention may be universally adapted to the various types of the recirculating-ball nut and screw sets, which differ, for example, in size of the ball nut incorporated, as long as the screw shaft is identical in standards. Thus, the present invention provides the lubrication means extensive in applicability. Moreover, the lubrication means of this invention may be simply attached to any ball nut of the recirculating-ball nut and screw sets, which have already been incorporated in cutting machine and the like, thereby easily improving the self-lubrication performance of the recirculating-ball nut and screw sets. Thus, the lubrication means of the present invention may be expected to make sure of self-lubrication performance even under too harsh situation for lubrication, thereby keeping the long-lasting good lubrication in the recirculating-ball nut and screw set to realize the maintenance-free as to lubrication.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 14:
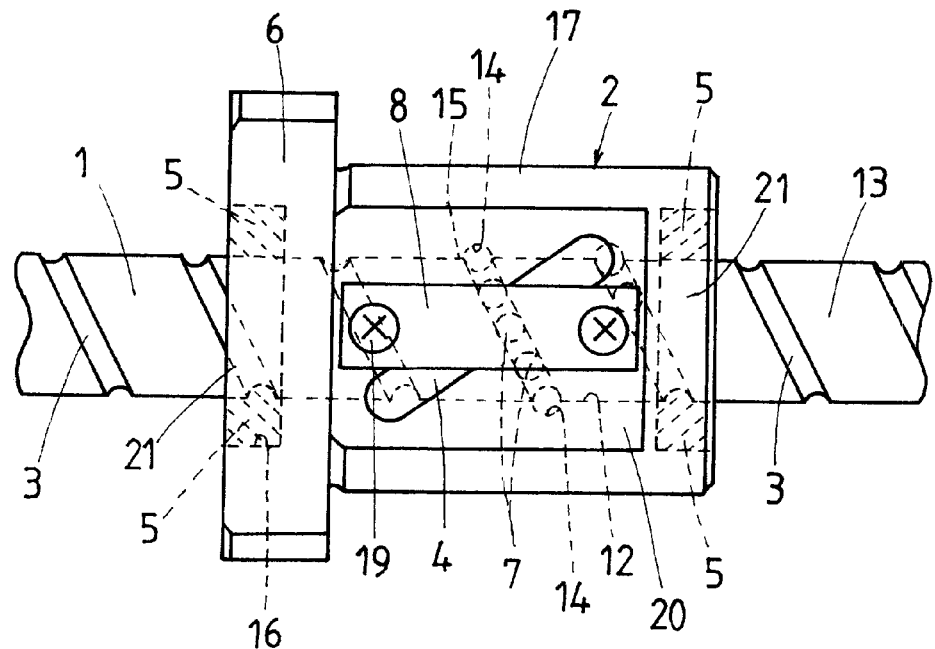
FIG. 14 is a side elevation showing a major part of a conventional circulating-ball nut and screw set.
Figure 15:
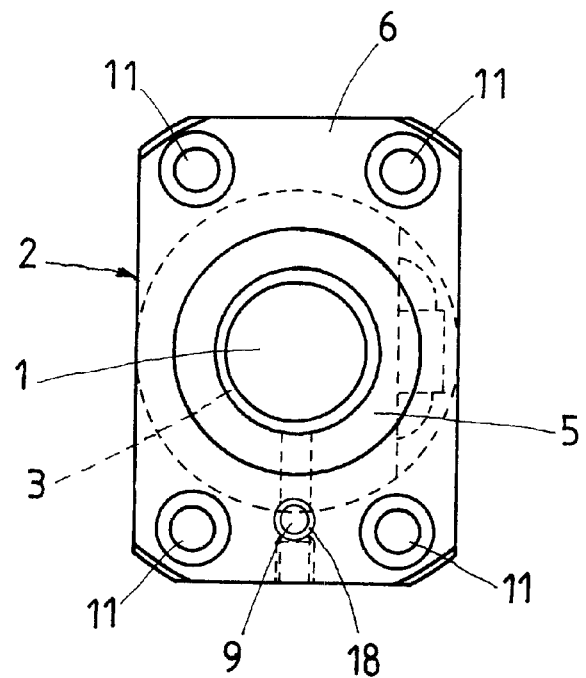
FIG. 15 is a front elevation of the conventional circulating-ball nut and screw set shown in FIG. 14.

Referring now in detail to FIGS. 1 to 12, a circulating-ball nut and screw set with lubrication means according to the present invention will be explained below. Lubrication means 10 of the present invention is the type of self-lubrication to realize the maintenance-free and shown as being installed on forward and aft ends of the ball nut 2 of the recirculating-ball nut and screw set as shown in FIGS. 14 and 15. It will be appreciated that the lubrication means 10 is applicable well to other types of recirculating-ball nut and screw sets. The circulating-ball nut and screw set referred to FIGS. 1 to 12 is substantially the same as the prior ball nut and screw set previously stated in reference to FIGS. 14 and 15. To that extent, the same reference character identifies components and parts equivalent or same in function and construction with those in the prior ball nut and screw set shown in FIGS. 14 and 15, so that the previous description will be applicable.

The present circulating-ball nut and screw set is mainly comprised of a round screw shaft 1 extending lengthwise, and a ball nut 2 fit around the screw shaft 1 for relatively sliding movement as the screw shaft 1 turns on its axis. The lubrication means 10 is mounted on at least one end of the forward and aft ends of the ball nut 2. With the embodiment stated here, the lubrication means 10 are installed on the forward and aft ends of the ball nut 2, each to each end. Each lubrication means 10 is composed of a lubricating-plate holder 25 fastened to the ball nut 2, an annular first lubricating plate 22 accommodated inside the holder 25, and more than one second lubricating plate 23 received in the holder 25 in a manner lying on top of the first lubricating plate 22. The holder 25 serves to keep the first and second lubricating plates 22, 23 in concentric alignment with one another and also keep lubricant impregnated in the lubricating plates 22, 23 against scattering all around.

Figure 4:
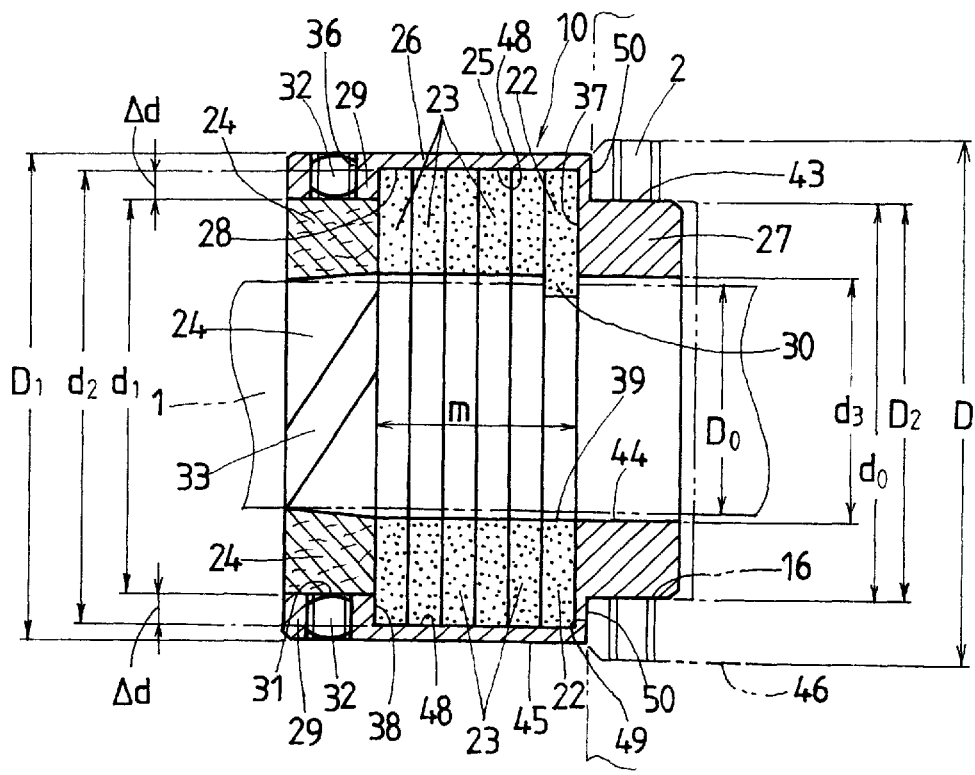
FIG. 4 is a traverse cross-section taken on the plane of the line I—I of FIG. 3.
Figure 11:
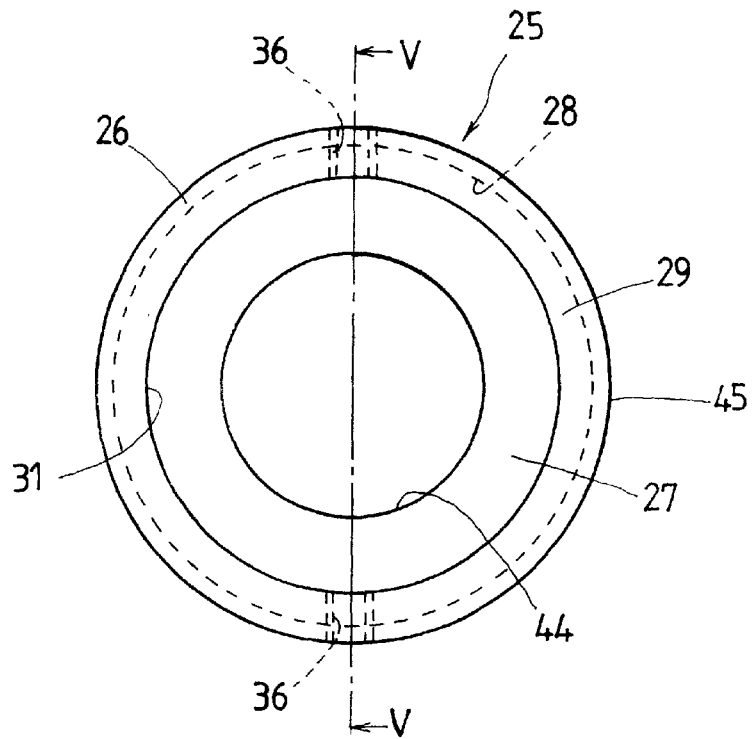
FIG. 11 is a front elevation showing a lubricating-plate holder.
Figure 12:
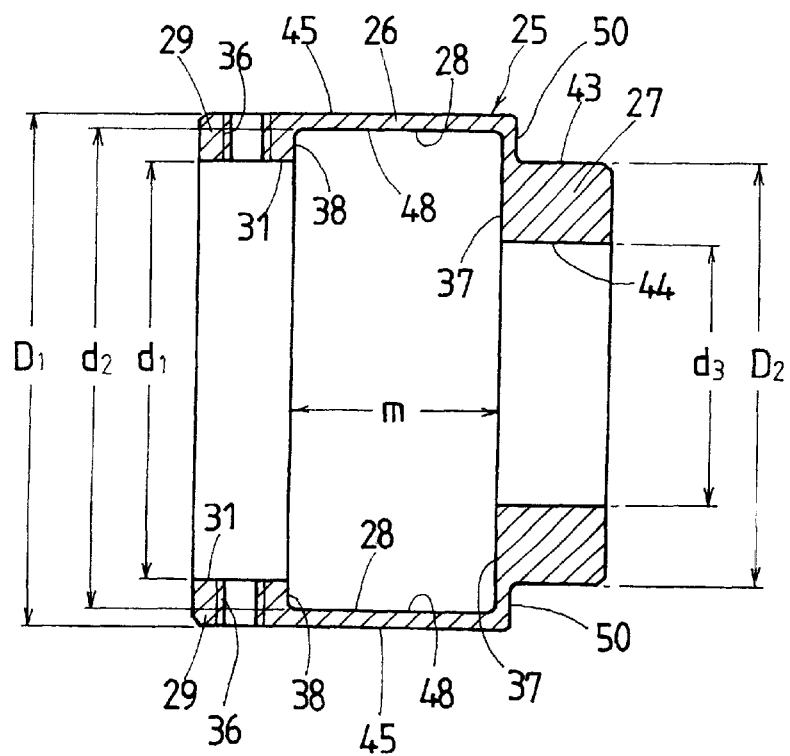
FIG. 12 is a traverse cross-section taken on the plane of the line V—V of FIG. 11.

The holder 25, as illustrated in detail especially in FIGS. 4, 11 and 12, as a whole is made in the configuration of a hollow cylinder, which includes a radially enlarged body 26 to accommodate therein all the first and second lubricating plates 22, 23 and a wiper seal 24 serving as an end seal, and a radially reduced neck 27 to fit in an annular recess 16 formed in the ball nut 2. In other words, the holder 25 is composed of the radially reduced neck 27 so formed as to fit in the ball nut 2 while fit loosely over the screw shaft 1, and the radially enlarged body 26 made integrally with the radially reduced neck 27 and radially larger than the radially reduced neck 27 to provide a shoulder 50, which will come into abutment against any end surface 49 of the ball nut 2. With the holder 25 constructed as stated earlier, an outside diameter $D_1$ defining an outside periphery 45 of the radially enlarged body 26 is made somewhat smaller in size than an outside diameter D defining an outside periphery 46 of the ball nut 2 so that the holder 25 may never cause any interference with other instrument or equipment. While the radially reduced neck 27 of the holder 25 fits in the annular recess 16 of the ball nut 2, the wiper seal 24 serving as the end seal fits in a mouth 29 left open in the radially enlarged body 26 of the holder 25. The wiper seal 24 is held in place with fasteners 32 that are screwed into matching holes 36 cut in the holder 25.

With the holder 25 of the present recirculating-ball nut and screw set, the outside diameter $D_1$ defining the outside periphery 45 of the radially enlarged body 26 is made somewhat smaller in size than the outside diameter D defining an outside periphery 46 of the ball nut 2, whereas an outer diameter $D_2$ defining the outside periphery 43 of the radially reduced neck 27 is made in a size allowing the neck 27, instead of the wiper seal 5 shown in FIG. 14, to fit snugly in the annular recess 16 of an insider diameter $d_o$ formed in any prior ball nut 2. A bore d3 defining an inside periphery 44 of the radially reduced neck 27 is made larger in size than an outside diameter $D_o$ of the screw shaft 1 to allow the radially reduced neck 27 to fit loosely around screw shaft 1. An inside diameter $d_1$ defining an inside periphery 31 of the mouth 29 bored in the radially enlarged body 26 is made a size conformable well to any wiper seal 24 that has previously fit in the prior ball nut.

Inside the radially enlarged body of the holder 25 there is a cavity 48 to receive therein more than one lubricating plate 22, 23. An inside diameter $d_2$ defining an inside periphery 28 of the cavity 48 is made larger than the inside diameter $d_1$ of the mouth 29, so that the lubrication plates 22, 23 will be kept against escape out of the cavity 48, for instance whether or not the wiper seal 24 fits in the mouth 29. In other words, the inside diameter $d_1$ defining the inside periphery 31 of the mouth 29 is made smaller than the diameter $d_2$ of the cavity 48 encircled with the inside periphery 28 of the hollowed holder 25 whereby the mouth 29 by itself provides means for keeping the lubricating plates 22, 23 in the radially enlarged body 26 of the holder 25 against escape out of the cavity 48 in the holder 25 even when the lubricating plates 22, 23 experience any stroke. Thus, a radial offset $\Delta d$ owing to a difference between the inside diameter $d_1$ defining the inside periphery 31 of the mouth 29 conforming to the wiper seal 24 and the inside diameter $d_2$ of the cavity 48 encircled with the inside periphery 28 to receive the lubricating plates 22, 23 therein will be instrumental in keeping the lubricating plates 22, 23 against escape out of the cavity 48 in the radially enlarged body 26 of the holder 25. That is, the lubricating plate 23 adjacent to the wiper seal 24 will come into engagement with an annular inward side 37 of the setback. The lubricating plate 22 lengthwise opposite to the wiper seal 24 is kept into abutment against an annular inward side 37 of the radially reduced neck 27. As a result, the lubricating plates 22, 23 are arranged in juxtaposition with each other and accommodated snugly in the cavity 48, which extends over a range "m" between the lengthwise opposing inward sides 37 and 38 in the radially enlarged body 26 of the holder 25.

The lubricating plates 22, 23 are each composed of a sintered resinous component of, for example, ultrahigh molecular weight polyethylene resin, which has a porous structure including continuous voids that are impregnated with lubricant. The lubricating plates 22, 23 are made of homogeneous substance to make sure of supplying smoothly a proper amount of lubricant into the helical groove. Only the lubricating plate 22 is made on an inside periphery 39 thereof with a tongue 30 that is allowed to come into sliding engagement with the helical groove 3 formed around the screw shaft 1. Other lubricating plates 23 are layered over the lubricating plate 22 to provide lubricant to the lubricant plate 22. The second lubricating plates 23 serve a function to make up for the lubricant consumed through the tongue 30 of the first lubricating plate 22. The juxtaposed lubricating plates 23 are held in direct surface-to-surface contact with each other in the holder 25 to allow the lubricant to flow successively toward the lubricating plate 23 closest the first lubricating plate 22.

Figure 7:
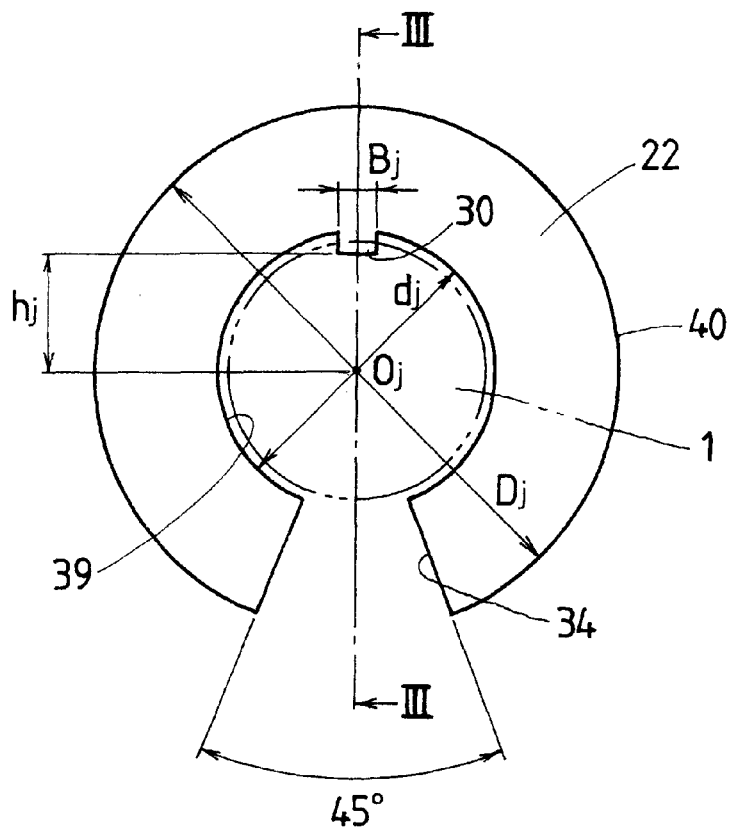
FIG. 7 is a front elevation showing a first lubricating plate.
Figure 8:
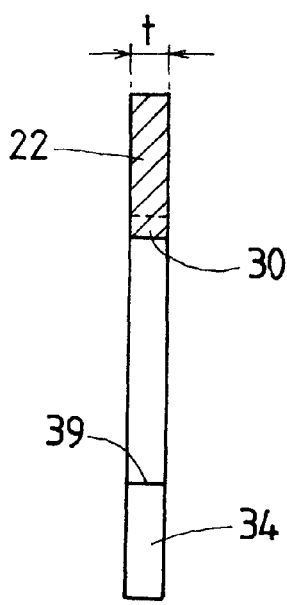
FIG. 8 is a traverse cross-section taken on the plane of the line III—III of FIG. 7.

The first lubricating plate 22, as illustrated in FIGS. 7 and 8, is cut away at 34 to have a C-shaped configuration in front view, and provided on the inside periphery 39 thereof with the tongue 30 that is raised radially inwardly with a width $B_j$ substantially equal in size with a thickness "t" of the first lubricating plate 22. It is to be understood that the first lubricating plate 22 is constructed in a configuration making its production easier and allowing the lubricant to flow smoothly, uniformly through the continuous pores in the sintered resinous component. An inside diameter $d_j$ defining the inside periphery 39 of the first lubricating plate 22 is made larger in size than the outside diameter $D_o$ of the screw shaft 1 so that the first lubricating plate 22 may fit loosely around the screw shaft 1, with not touching the outside periphery 13 of the screw shaft 1. On the other hand, an outside diameter $D_j$ defining an outer periphery 40 of the first lubricating plate 22 is made substantially equal in size with the inside diameter $d_1$ of the radially enlarged body of the holder 25. With the embodiment recited here, the first lubricating plate 22 is cut away at 34 in the form of a sector ranging over an angle of 45° about the center $O_j$ of the first lubricating plate 22.

Figure 9:
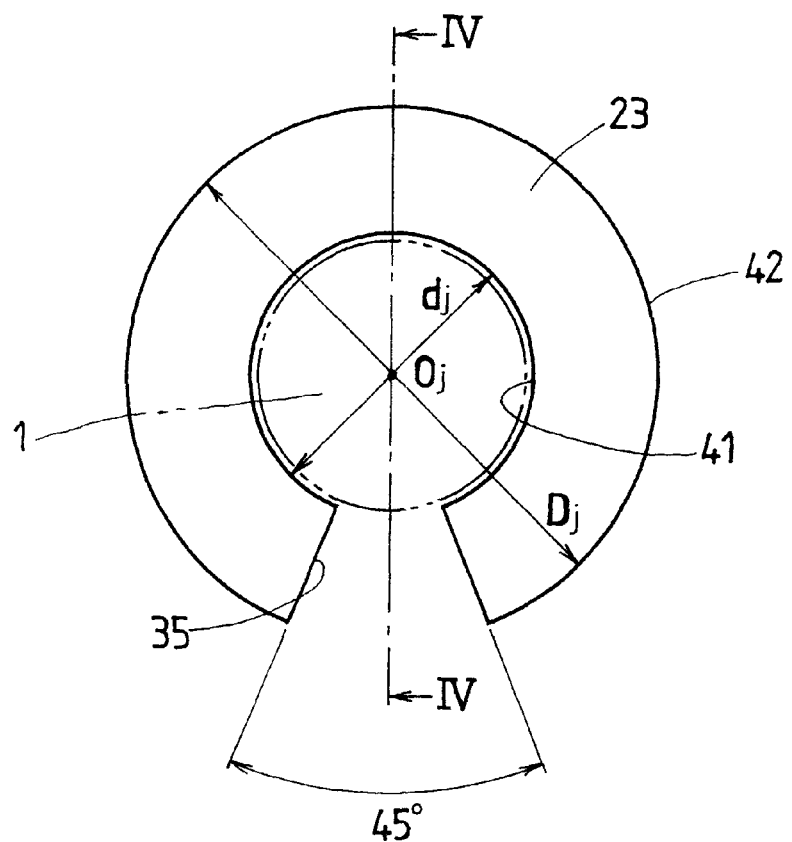
FIG. 9 is a front elevation showing a second lubricating plate.
Figure 10:
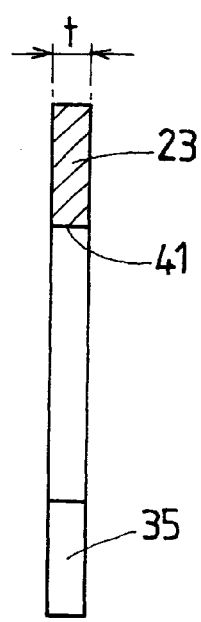
FIG. 10 is a traverse cross-section taken on the plane of the line IV—IV of FIG. 9.

The second lubricating plate 23, as shown in FIGS. 9 and 10, is substantially identical in configuration with the first lubricating plate 22 stated earlier, except that there is formed no tongue 30. Thus, both the first and second lubricating plates 22, 23, as being cut away from a single sintered resinous stock of thickness "t" common to both the lubricating plates 22, 23, are easy to produce and also use them. An inside diameter $d_i$ defining the inside periphery 41 of the second lubricating plate 23 is also made larger in size than the outside diameter $D_o$ of the screw shaft 1 so that the second lubricating plate 23 is allowed to fit loosely around the screw shaft 1. An outside diameter $D_j$ defining an outer periphery 42 of the second lubricating plate 23 is made substantially equal in size with the inside diameter $d_1$ of the radially enlarged body of the holder 25. The second lubricating plates 23, as shown in FIG. 4, are arranged in a manner adjacent to the first lubricating plate 22 to serve a function to replenish the first lubricating plate 22 with lubricant. Although but five second lubricating plates 23 are arranged in FIG. 4, it will be appreciated that only one second lubricating plate may be used. In some cases, only the first lubricating plate 22 may be used. As an alternative, the second lubricating plate 23 may be made different in thickness, and so on from the first lubricating plate 22.

Figure 1:
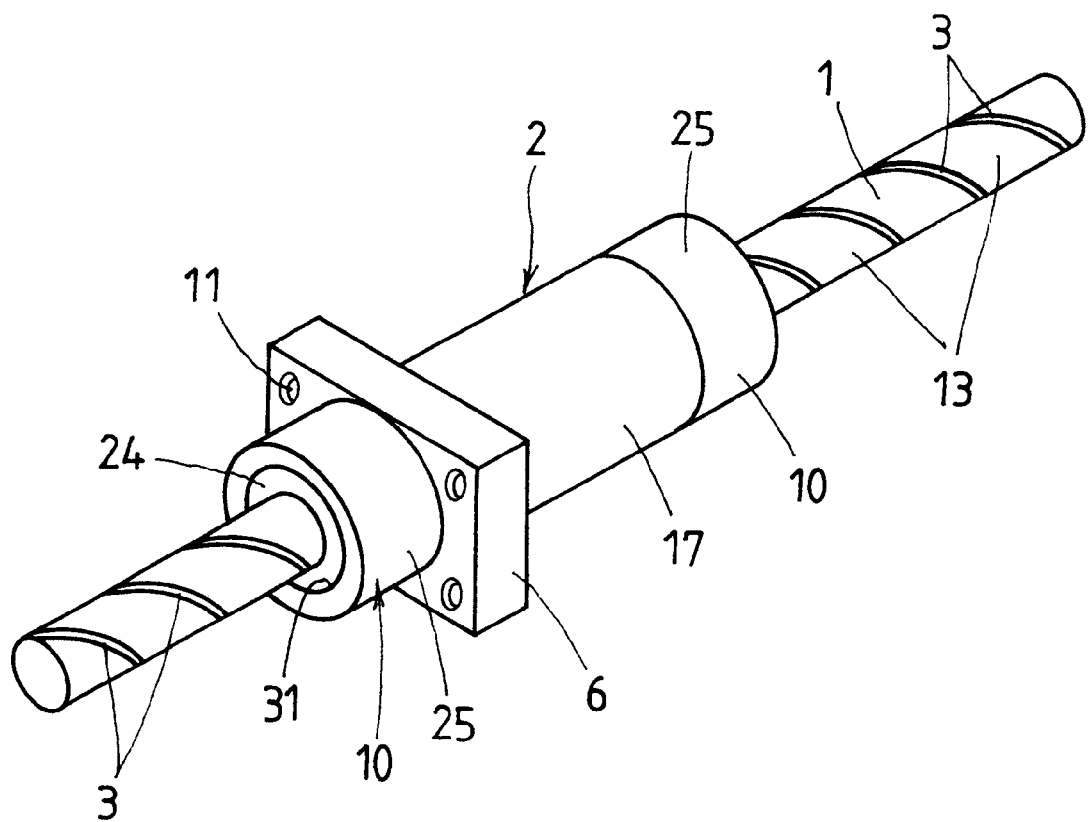
FIG. 1 is a perspective view showing a circulating-ball nut and screw set having incorporated with lubrication means according to the present invention.
Figure 2:
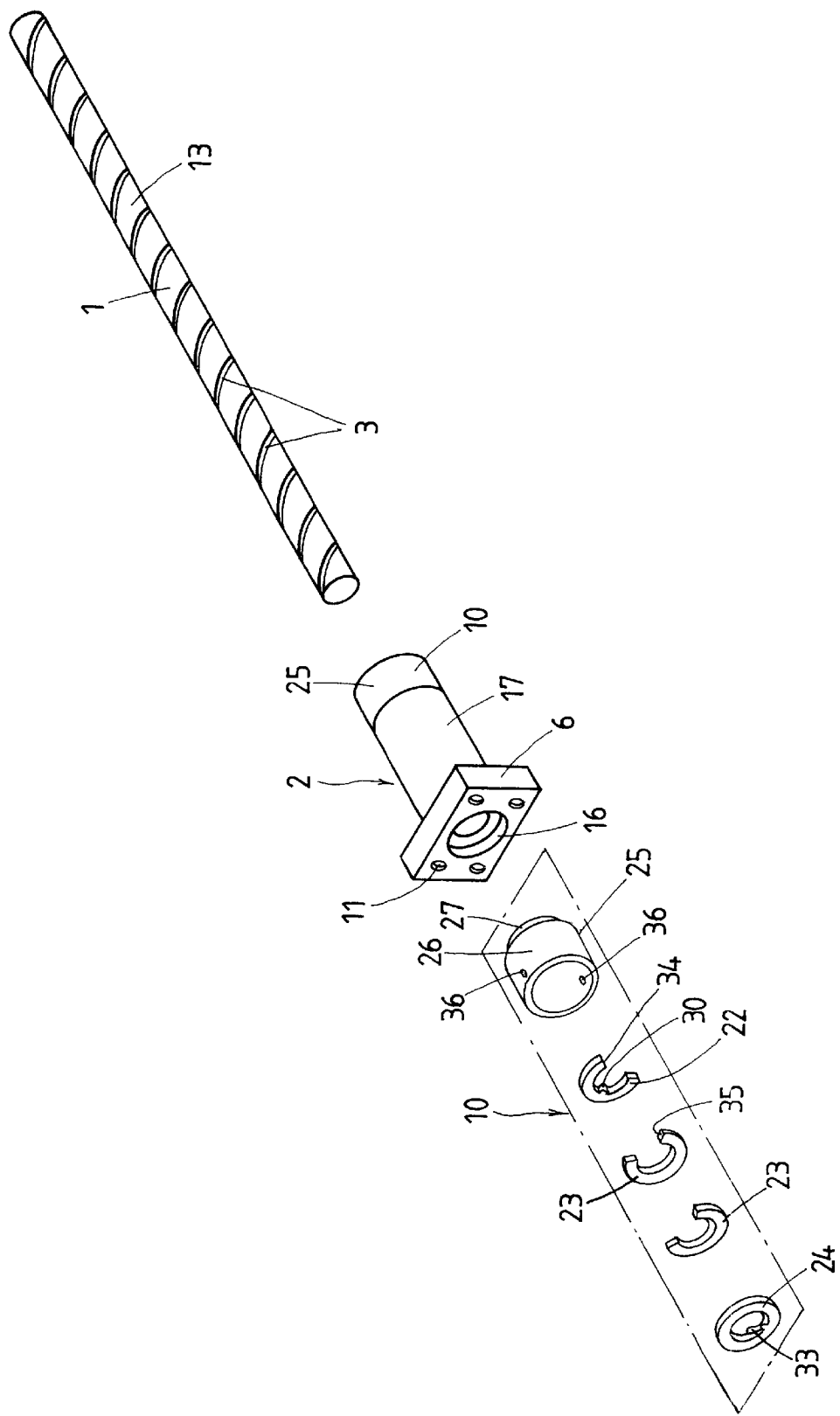
FIG. 2 is an exploded view of the circulating-ball nut and screw set to illustrate components inside the lubrication means.
Figure 3:
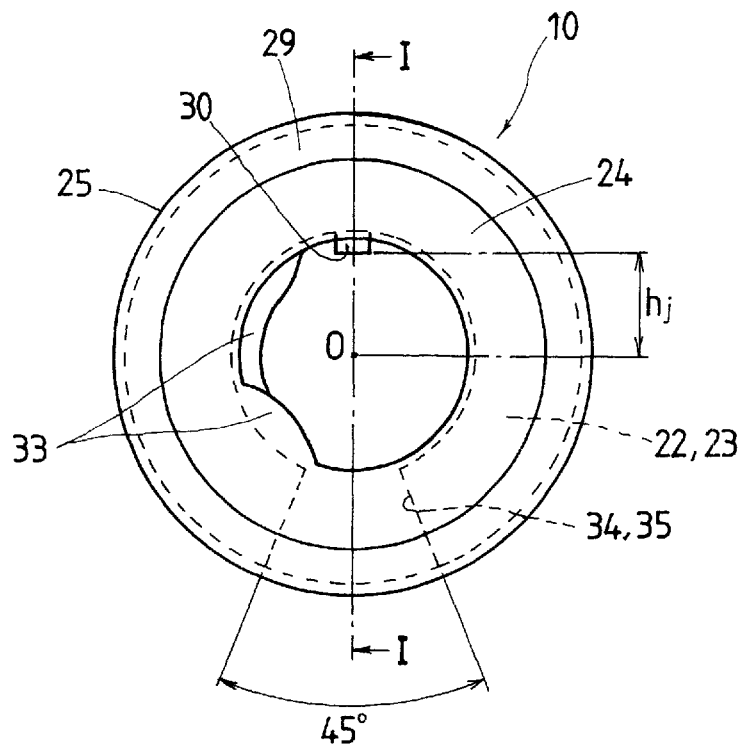
FIG. 3 is a front elevation of the lubrication means according to the present invention.

Both the first and second lubricating plates 22, 23 are each cut away from a sintered resinous stock and then formed in a C-shaped configuration where a sector 34, 35 is cut away. To install the lubricating plates 22, 23 in the radially enlarged body of the holder 25, the lubricating plates 22, 23 are compressed to reduce circumferentially the sectorial gaps 34, 35 to the degree to which the lubricating plates 22, 23 come to pass across the inside diameter of the mouth 29 into the radially enlarged body of the holder 25. With the lubricating plates 22, 23 juxtaposed in direct surface-to-surface contact with each other, the sectorial gaps 34, 35 need not be kept in angular alignment with one another; they can be arranged in a circumferentially staggered relation from each other as shown in FIG. 2.

The wiper seal 24 in the embodiment recited here is made with a spiral ridge 33, which may engage in a sliding manner with the helical groove 3 around the screw shaft 1 to wipe the helical groove 3.

Figure 6:
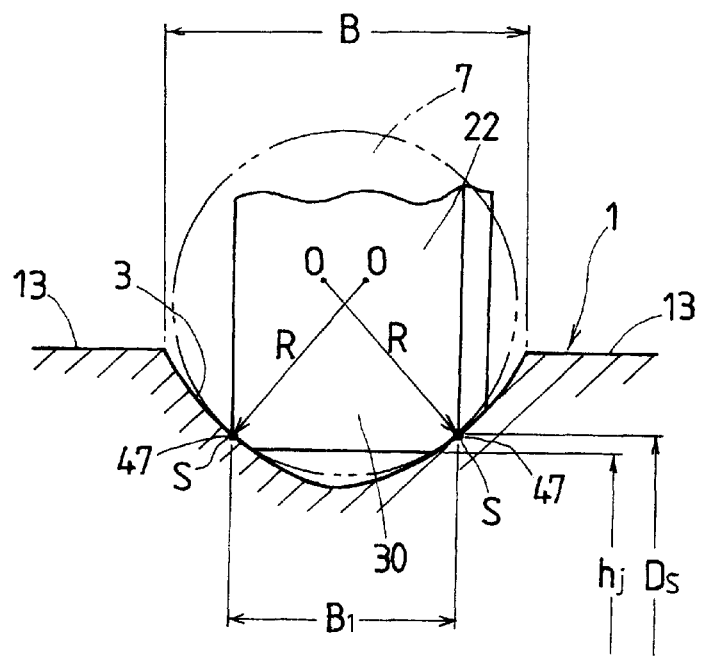
FIG. 6 is an explanatory fragmentary schematic view taken on the plane of the line II—II of FIG. 5.

The tongue 30 of the first lubricating plate 22 is made less in its circumferential width $B_j$ than the width B of the helical groove 3 to fit snugly in the helical groove 3 around the screw shaft 1. Thickness "t" of the first lubricating plate 22 is made substantially equal in size with the width $B_j$ of the tongue 30 to allow the tongue 30 to fit in the helical groove 3 around the screw shaft 1. Moreover, the tongue 30, as illustrated in FIG. 6, is made in a quadrangle in cross section to make sliding point-contact "S" at cornered edges 47 with a curved surface of the helical groove 3, thus rendering less the sliding contact areas to reduce frictional resistance while apply a proper amount of lubricant to the curved surface of the helical groove 3. Thus, the lubrication means 10 succeeds to apply little by little the lubricant, contained in the porous sintered resinous component, to the raceway of the helical groove 3 around the screw shaft 1.

Figure 5:
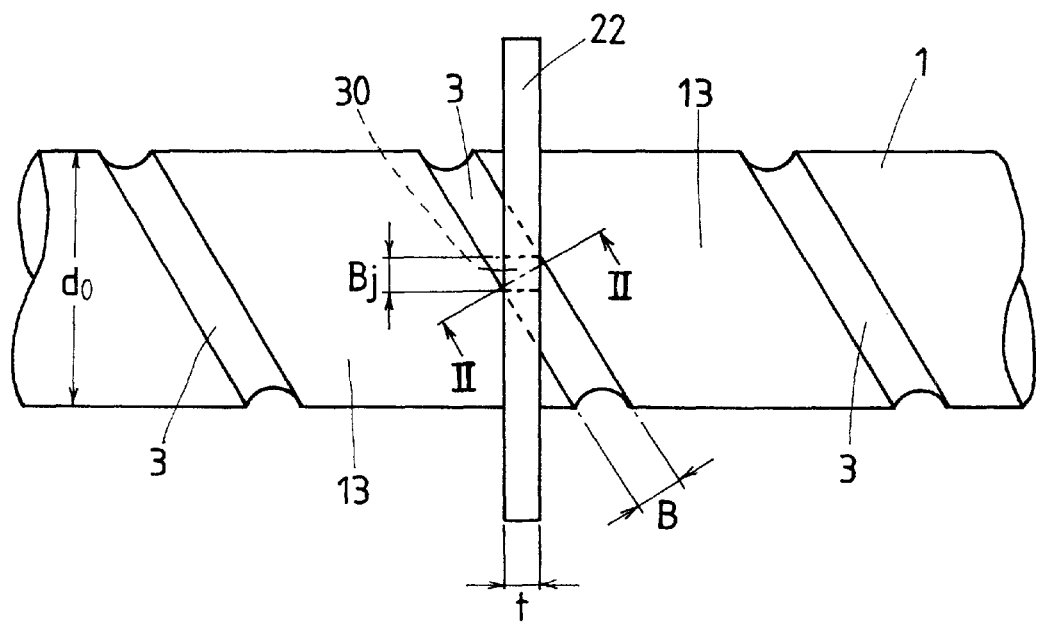
FIG. 5 is a schematic view explaining about how a lubricating plate comes into sliding engagement with a screw shaft.

The first lubricating plate 22, as illustrated in FIG. 5, is arranged in perpendicular to the axial direction of the screw shaft 1. Nevertheless, as the helical groove 3 around the screw shaft 1 is made obliquely with respect to the axis of the screw shaft 1, the first lubricating plate 22 lies obliquely across the helical groove 3. The thickness "t" and width $B_j$ of the tongue 30 are determined to allow the tongue 30 to fit in the helical groove 3 to a depth getting to the contact points "S". Moreover, the tongue 30 extends radially inwardly from the inside periphery 39 of the first lubricating plate 22 to reach a point separated away from the center $0_j$ of the first lubricating plate 22 by a length $h_j$ that is less than a half of a diameter $D_s$, which would be assumed between the contact point "S" where the tongue 30 first comes into sliding engagement at its cornered edge 47 with the helical groove 3 and an imaginary contact point opposed diametrally to the contact point "S". The width $B_j$ and the thickness "t" of the tongue 30 are made substantially identical with each other. The screw shaft 1 has only a single helical groove 3 and correspondingly the first lubricating plate 22 is provided on the inside periphery thereof with only one tongue. The helical groove 3, as being of a single type, is made in a groove resembling Gothic arch, or pointed arch in traverse cross-section as illustrated in FIG. 6, which consist of tow intersecting arcs of a circle having a radius "R" of curvature.

The following will explain how to mount the lubrication means 10 of the present invention on the opposite ends, each to each end, of the concurrently available circulating-ball nut and screw set as shown in FIG. 14. First of all, the wiper seals 5 are removed from the opposite ends of the ball nut 2 to open the annular recesses 16 of the ball nut 2 for the lubrication means 10 of the present invention. As the radially reduced neck 27 of the holder 25 is made to have the outside periphery 43 of the diameter conforming to the inside diameter of the annular recess 16, the lubrication means 10 are attached to the ball nut 2 by fitting the radially reduced neck 27 of the holder 25 in the annular recesses 16, each to each recess. Moreover, the wiper seals 5 removed earlier from the ball nut 2, as made in a size conforming to the mouth 29 of the holder 25 in the lubrication means 10, are allowed to fit in the mouth 29 of the holder 25, thus serving as the wiper seals 25.

Figure 13:
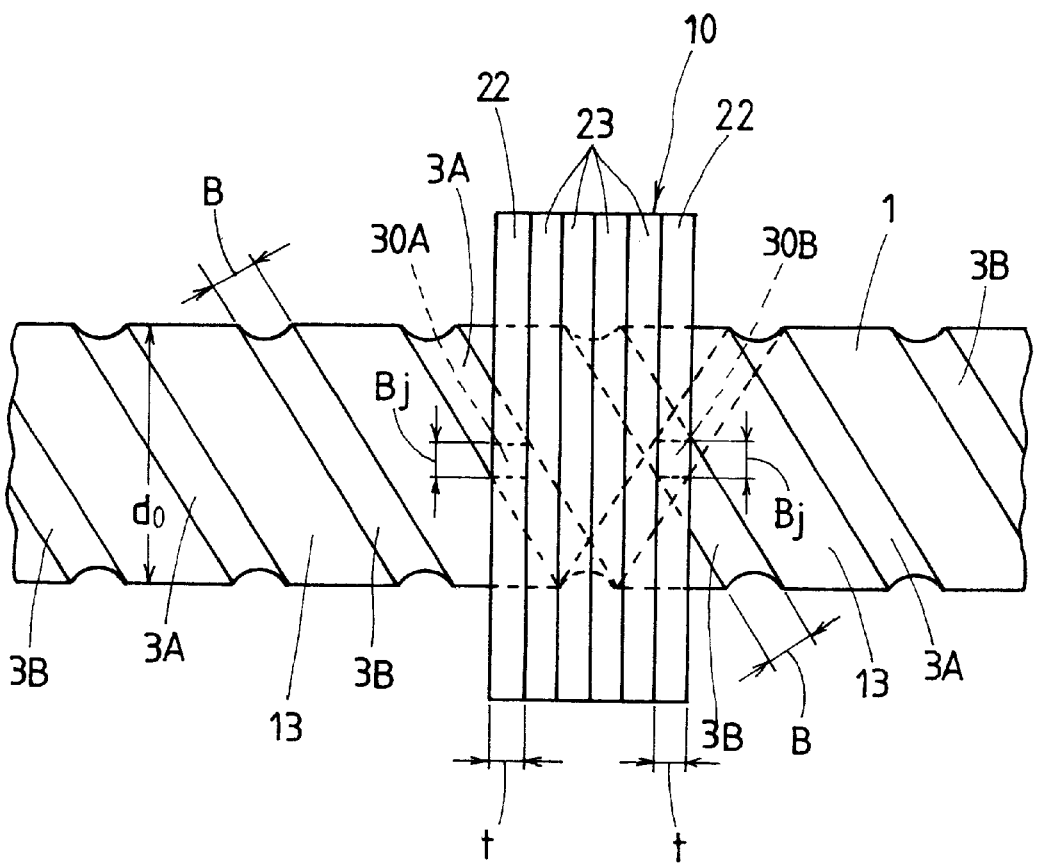
FIG. 13 is a schematic view explaining another embodiment of the lubricating plate coming into sliding engagement with a screw shaft.

Referring finally to FIG. 13, there is shown another embodiment of the recirculating-ball nut and screw set having incorporated with the lubrication means according to the present invention. With this embodiment recited hereinafter, the screw shaft 1 is made with more than one helical groove, for example two grooves 3A and 3B in FIG. 3 and correspondingly more than one first lubricating plate 22 is incorporated to provide tongues 30A and 30B that will come into sliding engagement with the grooves 3A and 3B, each to each groove. In the lubrication means 10 for the recirculating-ball nut and screw set made with more than one helical groove, a required number of the first lubricating plates 22 is determined depending on the number of helical grooves 3A, 3B formed around the screw shaft 1. Thus, each tongue 30A, 30B of each first lubricating plate 22 makes sliding engagement with the associated helical groove 3A, 3B to apply lubricant to the helical grooves, respectively. In other words, where the screw shaft 1 has two helical grooves 3, two first lubricating plates 22 each having the tongue 30 are installed in the lubrication means 10 in such a manner that the tongues 30A, 30B lie on the centerline of the lubrication means 10 at any angular places suitable for making sure of steady sliding motion of the lubrication means 10. With an alternative in which the screw shaft 1 has three helical grooves 3, three first lubricating plates 22 each having the tongue 30 are installed in the lubrication means 10 in such a manner that the tongues 30 are each arranged in conforming to each helical groove 3 at any angular place suitable for making sure of steady sliding motion of the lubrication means 10.

While the present invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A recirculating-ball nut and screw set with lubrication means; comprising a round screw shaft extending lengthwise, a ball nut fitting around the screw shaft to provide a slider movable along the screw shaft by virtue of balls as the screw shaft turns on an axis thereof, and lubrication means installed on at least one end of forward and aft ends of the ball nut;

wherein the lubrication means is comprised of a holder fastened to the ball nut, and at least one lubricating plate accommodated in the holder;

wherein the lubricating plate includes a first annular lubricating plate, and a second annular lubricating plate arranged in surface contact with the first lubricating plate so as to replenish the first lubricating plate with the lubricant;

wherein the first lubricating plate has a tongue that extends inwardly from an inside periphery of the first lubricating plate to come partially into sliding engagement with a helical groove around the screw shaft, so that the lubricating plate makes sliding engagement with the helical groove at only the tongue when the ball nut moves back and forward with respect to the screw shaft;

wherein the second lubricating plate is identical in configuration to the first lubricating plate without the tongue, and more than one second lubricating plate is accommodated in the holder in a manner lying on top of another;

wherein the first and second lubricating plates are each made of a sintered resinous component of porous structure having cells impregnated with lubricant, and formed in a configuration of C-shape where a sector is removed;

wherein the holder is engaged at any one end of forward and aft ends thereof in the ball nut, while at another end around a wiper seal;

wherein the holder is composed of a radially reduced neck having the one end that fits in the ball nut, and a radially enlarged body formed integrally with the radially reduced neck to provide the another end engaged to the wiper seal; and wherein the radially enlarged body of the holder is made larger in outer diameter than the radially reduced neck to provide a shoulder, which comes into abutment against an associated end surface of the ball nut, and also includes a major area for accommodating therein the lubricating plate, which is made larger in inside diameter than the radially reduced neck.

2. A recirculating-ball nut and screw set constructed as defined in claim 1, wherein the tongue of the first lubricating plate is made less in width than the helical groove to thereby assure a snug fit in the helical groove.

3. A recirculating-ball nut and screw set constructed as defined in claim 1, wherein the width of the tongue formed in the first lubricating plate is substantially equal in size with a thickness of the lubricating plate.

4. A recirculating-ball nut and screw set constructed as defined in claim 1, wherein the first lubricating plate is matched in number to that of the helical groove formed around the screw shaft, and the tongues of the first lubricating plates come into sliding engagement with the helical grooves, each to each groove, to apply the lubricant to the helical grooves, respectively.

5. A recirculating-ball nut and screw set constructed as defined in claim 1, wherein the radially enlarged body of the holder is formed as a hollow cylinder having an outside diameter made somewhat smaller than that of the ball nut.

6. A recirculating-ball nut and screw set constructed as defined in claim 1, wherein a radial offset owing to a difference between the inside diameter of the another end conforming to the wiper seal and the inside diameter of the major area to contain the lubricating plate therein is instrumental in keeping the lubricating plate against escape out of the major area.

7. A recirculating-ball nut and screw set constructed as defined in claim 6, wherein the lubricating plate is compressed to reduce circumferentially the sectorial gap to install the lubricating plate across the another end of the radially enlarged body into the major area inside the holder.

8. A recirculating-ball nut and screw set constructed as defined in claim 1, wherein the radially enlarged body at the another end in which the wiper seal fits is made smaller.

* * * * *